United States Patent
Oettinger et al.

(10) Patent No.: US 10,530,196 B2
(45) Date of Patent: Jan. 7, 2020

(54) METHODS AND APPARATUS FOR POWER LOSS CALIBRATION IN A WIRELESS POWER SYSTEM

(71) Applicant: Texas Instruments Incorporated, Dallas, TX (US)

(72) Inventors: Eric Gregory Oettinger, Rochester, MN (US); Kalyan N. Siddabattula, Flower Mound, TX (US)

(73) Assignee: Texas Instruments Incorporated, Dallas, TX (US)

( * ) Notice: Subject to any disclaimer, the term of this patent is extended or adjusted under 35 U.S.C. 154(b) by 385 days.

(21) Appl. No.: 15/410,590

(22) Filed: Jan. 19, 2017

(65) Prior Publication Data

US 2017/0229926 A1 Aug. 10, 2017

Related U.S. Application Data

(60) Provisional application No. 62/291,715, filed on Feb. 5, 2016.

(51) Int. Cl.
*H02J 50/80* (2016.01)
*H02J 50/60* (2016.01)
(Continued)

(52) U.S. Cl.
CPC .............. *H02J 50/80* (2016.02); *H02J 50/12* (2016.02); *H02J 50/60* (2016.02); *H04B 5/0037* (2013.01)

(58) Field of Classification Search
CPC .................................. H04B 5/00; H04B 5/0037
See application file for complete search history.

(56) References Cited

U.S. PATENT DOCUMENTS 6,529,710 B1 * 3/2003 Lindemann .......... H03G 3/3042
455/126
2010/0270867 A1 * 10/2010 Abe ....................... H02J 7/025
307/104

(Continued)

FOREIGN PATENT DOCUMENTS

WO WO2014060871 A1 4/2014
WO WO2015194969 A1 12/2015

OTHER PUBLICATIONS

Search Report for PCT Application No. PCT/US17/16752, dated May 11, 2017 (1 page).

(Continued)

*Primary Examiner* — Jared Fureman
*Assistant Examiner* — Emmanuel Dominique
(74) *Attorney, Agent, or Firm* — Tuenlap Chan; Charles A. Brill; Frank D. Cimino

(57) ABSTRACT

In an example, an integrated circuit includes a communication and control unit. The communication and control unit controls an inverter that applies an alternating current output signal to a transmission coil for reception by a receiver. The communication and control unit causes the inverter to provide a first and second transmit powers to the transmission coil, and the communication unit receives a first and second power received signals from the receiver in response to the first and second transmit powers. The communication and control unit determines a first gain and offset using the first transmit power, the first power. When a third transmit power greater than the second transmit power is transmitted by the transmission coil, the communication and control unit determines a second gain and a second offset using the first transmit power, the first power received signal, the third transmit power and a third power received signal.

20 Claims, 3 Drawing Sheets

(51) Int. Cl.
*H02J 50/12* (2016.01)
*H04B 5/00* (2006.01)

(56) References Cited

U.S. PATENT DOCUMENTS

| | | | |
|---|---|---|---|
| 2011/0196544 A1 | 8/2011 | Baarman et al. | |
| 2013/0307348 A1* | 11/2013 | Oettinger | H01F 38/14 307/104 |
| 2015/0008756 A1* | 1/2015 | Lee | H02J 17/00 307/104 |
| 2015/0263532 A1 | 9/2015 | Van Wageningen | |
| 2018/0138758 A1* | 5/2018 | Jung | H02J 7/0021 |

OTHER PUBLICATIONS

"The Qi Wireless Power Transfer System, Power Class 0 Specification" (version 1.2.2, Apr. 2016) ("Qi Specification") (160 pages) available from the Wireless Power Consortium (WPC) which is currently available at https://www.wirelesspowerconsortium.com/developers/specification.html.

"The Qi Wireless Power Transfer System, Power Class 0 Specification, Parts 1 and 2: Interface Definitions" (version 1.2.2, Apr. 2016), Wireless Power Consortium (WPC), 445 Hoes Lane Piscataway, NJ 08854, USA, https://www.wirelesspowerconsortium.com/developers/specification.html.

"The Qi Wireless Power Transfer System, Power Class 0 Specification, Part 4: Reference Designs" (version 1.2.2, Apr. 2016), Wireless Power Consortium (WPC), 445 Hoes Lane Piscataway, NJ 08854, USA, https://www.wirelesspowerconsortium.com/developers/specification.html.

Supplementary European Search Report for Application No. 17748367.4, Date of completion of search Jan. 14, 2019 (1 page).

* cited by examiner

METHODS AND APPARATUS FOR POWER LOSS CALIBRATION IN A WIRELESS POWER SYSTEM

CROSS-REFERENCE TO RELATED APPLICATIONS

This application claims the benefit of priority under 35 U.S.C. § 119(e) to co-owned U.S. Provisional Patent Application Ser. No. 62/291,715, filed Feb. 5, 2016, entitled "Improved Power Loss Calibration in a Wireless Power System," naming Oettinger et. al. as inventors, which is hereby incorporated by reference herein in its entirety.

TECHNICAL FIELD

This relates generally to wireless power transfer, and, in particular, to foreign object detection in wireless power transfer.

BACKGROUND

Wireless transmission of power is very useful in, for example, charging of battery operated devices. One of the more popular applications for this technology is charging cell phones. The cell phone (receiver) is placed on a power transmitter such that tuned coils in the receiver align with tuned coils in the transmitter. The aligned coils act as a transformer to wirelessly transfer power from the transmitter to the receiver. The energy received by the phone is used to charge the battery in the phone.

One of the most challenging aspects to wireless power transfer is the prevention of heating of metal objects (foreign objects) in the magnetic field (i.e., between the coils of the transmitter and receiver). The Wireless Power Consortium (WPC) has been trying to address this problem for several years and is steadily making progress. To date, the primary method used to detect when a foreign object is present is "Power Loss Accounting" in which Equation (1) accounts for all power terms:

$$P_{input} = P_{received} + P_{known\ losses} + P_{unexpected\ losses} \quad [1]$$

Where: $P_{input}$ is the input power supplied to the transmitter from an external source for transmission, $P_{received}$ is the total power received by the device being charged including expected losses in the receiver, $P_{known\_losses}$ is the known losses in the power transmitter, and $P_{unexpected\_losses}$ is the unexpected losses assumed to be due to a foreign object.

When $P_{unexpected\_losses}$ exceeds a threshold, the transmitter can shut down to prevent potentially dangerous heating. This can occur when a foreign object is incorrectly located in the magnetic field, or is between the transmitter and the receiver. The threshold for several common objects such as coins, rings, and foil candy wrappers that prevents exceeding thermal targets has experimentally been determined to be about 500 mW. However, several measurement limitations, as explained further below, make it difficult to accurately determine when the loss is caused by a foreign object or when the loss is caused by other acceptable losses within the transmission system.

SUMMARY

In accordance with an example embodiment, a wireless power transmitter includes a communication and control unit. The communication and control unit includes a control unit for controlling an inverter, the inverter converting an input voltage to an alternating current output signal for application to a transmission coil for reception by a receiver. The communication and control unit also includes a communication unit for modulating transmissions to the receiver and demodulating transmissions from the receiver. The control unit causes the inverter to provide a first transmit power to the transmission coil and the communication unit receives a first power received signal from the receiver in response to the first transmit power. The control unit causes the inverter to provide a second transmit power to the transmission coil and the communication unit receives a second power received signal from the receiver in response to the second transmit power. The communication and control unit uses the first transmit power, the first power received signal, the second transmit power and the second power received signal to determine a first gain and a first offset. When a third transmit power greater than the second transmit power is transmitted by the transmission coil and a third power received signal is received by the communication unit from the receiver in response to the third transmit power, the communication and control unit determines a second gain and a second offset using the first transmit power, the first power received signal, the third transmit power and the third power received signal.

DETAILED DESCRIPTION

Corresponding numerals and symbols in the different figures generally refer to corresponding parts unless otherwise indicated. The figures are not necessarily drawn to scale.

The term "coupled" may include connections made with intervening elements, and additional elements and various connections may exist between any elements that are "coupled."

Figure 1:
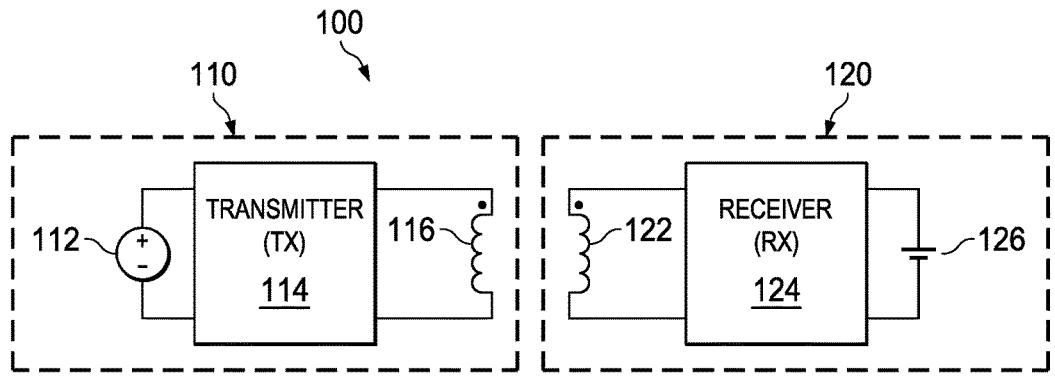
FIG. 1 is a diagram of a simplified wireless power transmission system.

FIG. 1 is a block diagram of a simplified wireless power transmission system 100. Transmission unit 110 includes transmitter 114, power source 112 and coil 116. Power source 112 can be a direct current (DC) supply derived from a power outlet. The voltage of power source 112 is usually in the range of about 5 to about 24 Volts. Coil 116 is part of a resonant circuit including capacitor(s) (not shown) that may be in series and/or in parallel with coil 116. Transmitter 114 converts the DC voltage provided by power source 112 to an alternating current (AC) near the resonant frequency of coil 116.

Receiver unit 120 includes coil 122, receiver 124 and battery 126. Coil 122 is part of a resonant circuit including a capacitor(s) (not shown) that may be in series and/or in parallel with coil 122. Coil 122 is designed to resonate near the same frequency as coil 116. Having both coils resonate near the same frequency allows for more efficient energy transfer. Receiver 124 converts the energy received by coil 122 to a DC voltage that is used to charge battery 126. In one example, receiver unit 120 forms a portion of a battery powered portable communications device or portable computer. Mobile telephones, personal digital assistants (PDAs), tablet computers, portable music and video players, portable electronic games, smart watches and laptop computers are example devices. The transmission unit 110 can be a portion of a wireless charging station that can inductively couple to and charge a portable device.

Figure 2:
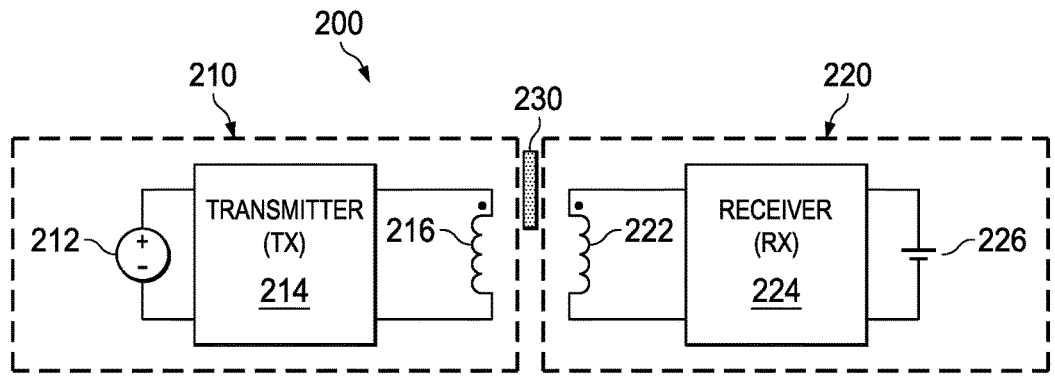
FIG. 2 is a diagram of a simplified wireless power transmission system including a foreign object.

FIG. 2 is a block diagram of a simplified wireless power transmission system 200 including a foreign object 230. Similarly numbered components in FIG. 2 perform similar functions to the components in FIG. 1, for clarity. For example, transmission unit 210, power supply 212, transmitter 214, receiver unit 220, receiver 224 and battery 226 perform similar functions as transmission unit 110, power supply 112, transmitter 114, receiver unit 120, receiver 124 and battery 126, respectively, of FIG. 1. FIG. 2 shows a foreign object 230 positioned between coils 216 and 222. Coils 216 and 222 are matching resonant coils similar to coils 116 and 122 of FIG. 1. Power is transferred from coil 216 to coil 222 by the alternating magnetic field established by the AC current passing through coil 216. Ideally, as much of that magnetic energy as possible induces current in coil 222. However, if foreign object 230 is conductive, at least a part of the magnetic field will cause eddy and/or induced currents in foreign object 230. This will cause heating of foreign object 230. If more than about 500 mW of energy is absorbed by foreign object 230, the object may become hot enough to cause injury to a human or present a fire hazard. To avoid this hazard, wireless transmission systems may include foreign object detection (FOD) as described hereinbelow. If a foreign object is detected, transmitter 214 can reduce power or can stop transmitting entirely. The system may also provide a warning indication such as a warning light or tone.

Figure 3:
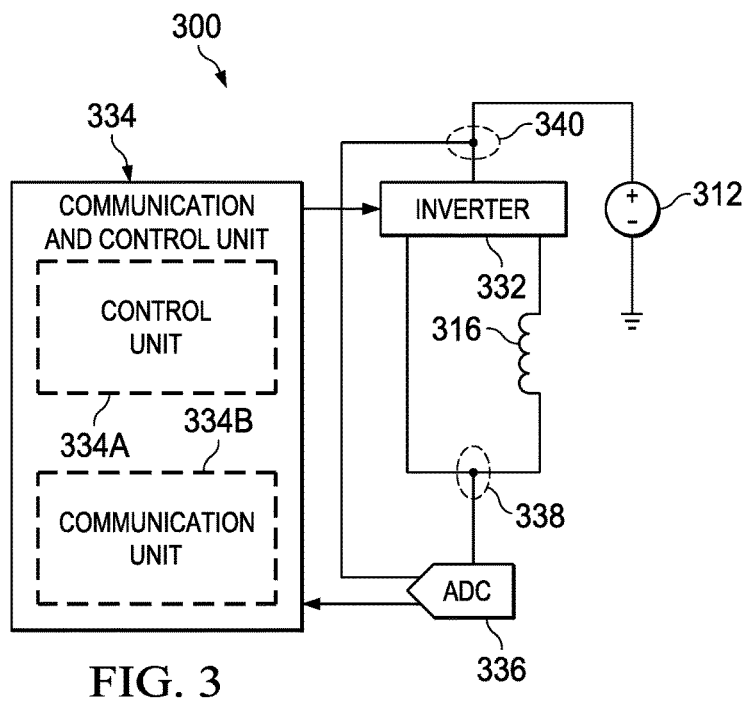
FIG. 3 is a block diagram of a power transmitter.

FIG. 3 is a block diagram of a power transmitter 300 that can be used with an aspect of the present application. Similarly numbered components in FIG. 3 perform similar functions as the components in FIG. 1. For example, coil 316 performs a similar function to coil 116 in FIG. 1. Power is provided by power supply 312 to inverter 332, which is under the control of communication and control unit 334. Communication and control unit 334 includes control unit 334A and communications unit 334B. Inverter 332 converts the DC power provided by power supply 312 to an AC current at the resonant frequency of coil 316. In an example, coil 316 can have a resonant frequency of about 100 kHz. Other resonant frequencies can be used. This AC current is applied to coil 316 for transmission. Inverter 332 also includes capacitances (not shown) to tune the circuit including coil 316 to resonate at the desired frequency. The operating frequency of the transmitter can be in a range between 110 kHz and 205 kHz. An example design operates around 130 kHz using a tuned resonant frequency of about 100 kHz for the coil.

Communication unit 334B provides commands to modulate the signal on coil 316 to provide communications to a coupled receiver. This may be done by using the Control Unit 334A to modify the frequency of the output to use frequency shift keying (FSK) modulation by driving the pulse width modulated (PWM) signals at a different frequency. In alternative arrangements, another form of modulation, such as phase shift keying (PSK), can be used.

Analog to digital converter (ADC) sensing unit 336 senses the current to inverter 332 at sense port 340. This current sense information is used to determine power applied from power supply 312 to inverter 332. A tank voltage measurement taken at node 338 is provided to communication and control unit 334. The tank voltage information allows communication and control unit 334 to determine the power being supplied on coil 316 and any communication that may come from the receiver, as further explained hereinbelow. A more detailed explanation of an example power transmission system may be found in "The Qi Wireless Power Transfer System, Power Class 0 Specification" (version 1.2.2, April 2016) ("Qi Specification") available from the Wireless Power Consortium (WPC) which is currently available at https://www.wirelesspower-consortium.com/developers/specification.html and which is incorporated herein in its entirety by reference.

Figure 4:
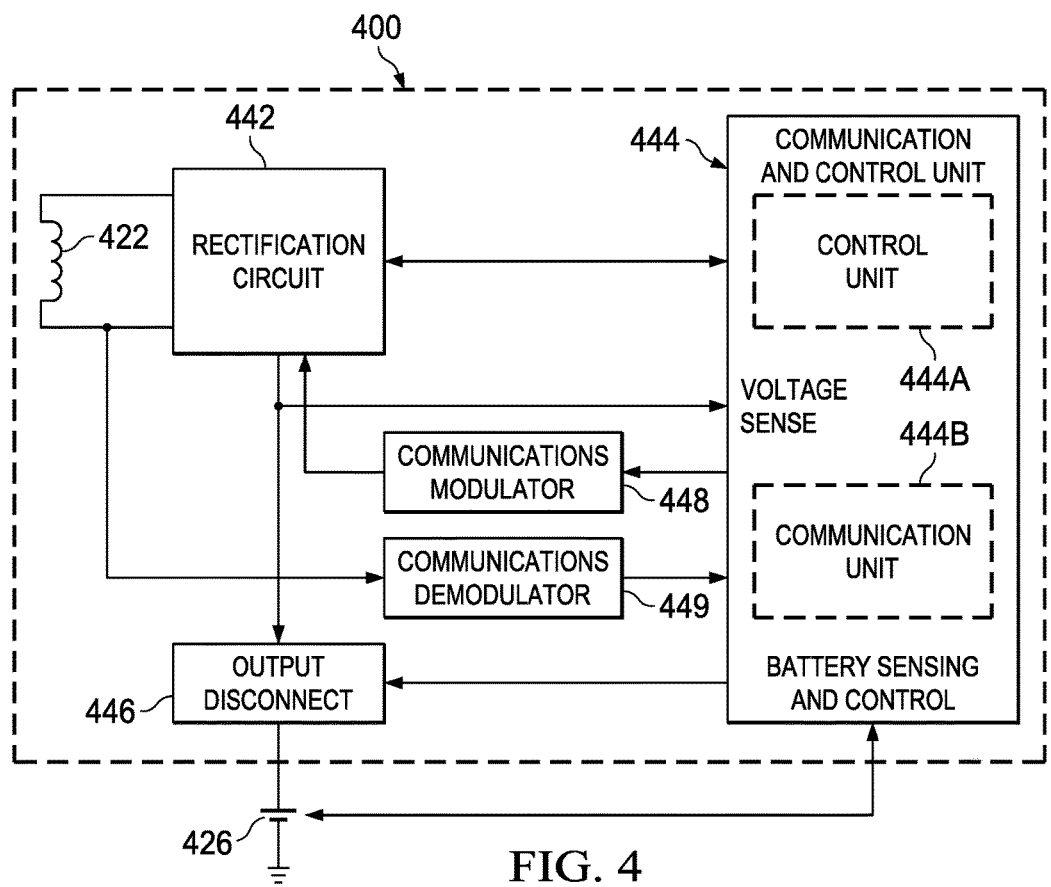
FIG. 4 is a block diagram of a power receiver.

FIG. 4 is a block diagram of a power receiver 400 for use in another aspect of the present application. Similarly numbered components in FIG. 4 perform similar functions as components in FIG. 1. For example, coil 422 in FIG. 4 corresponds to coil 122 in FIG. 1. Power is received on coil 422 from a transmitter (not shown in FIG. 4) and provided to rectification circuit 442. Rectification circuit 442 can be implemented as a passive four diode bridge, or by another rectification circuit. The received AC power is converted to DC power by rectification circuit 442 and can be applied to battery 426 via output disconnect 446. The output of rectification circuit 442 couples to a voltage sensing input "Voltage Sense" of communications and control unit 444. Output disconnect 446 operates under the control of communications and control unit 444 and disconnects the battery in the case of an error condition or if the battery is fully charged. The charge status of battery 426 is monitored by control unit 444A via a battery sensing and control input of the communications and control unit 444.

Optional communications demodulator 449 is coupled to coil 422 and receives the AC signal from coil 422. The use of transmit and receive or "TX-RX" communications between the transmitter and receiver is contemplated as forming one arrangement of the present application, but in another arrangement, other arrangements can omit these features. In the embodiment of FIG. 4, any communications from a transmitter received in coil 422 is demodulated by communications demodulator 449 and the communications unit 444B. To demodulate signals received from a transmitter, the Communication Unit counts cycles in a reference time period to detect the frequency shift keyed (FSK) modulation from the transmitter. In FIG. 4, optional communications modulator 448 can receive information from communications unit 444B and modulate the power receiver side of the power transmission system to provide a modulated signal. In example arrangement, amplitude modulation (AM) is used. The modulated signal can be transmitted on coil 422 to a transmission system and received by a component in the transmission system, such as the communication unit 334B of transmitter 300 in FIG. 3 (not shown in FIG. 4).

In the example of FIG. 4, communications modulator 448 communicates to rectification circuit 442. The signal on coil 422 is modulated in rectification circuit 442. Coils 422 and the corresponding coil in a power transmission circuit such as coil 316 in FIG. 3 operate as a transformer when in proximity to one another. Modulating the impedance on the receiver side causes a change in the impedance of the entire transformer circuit. These modulated signals can be demodulated by a communication unit in the power transmitter side, such as communication unit 334B in FIG. 3. A more detailed explanation of an example receiver system may be found in the Qi Specification, referenced hereinabove.

Figure 5:
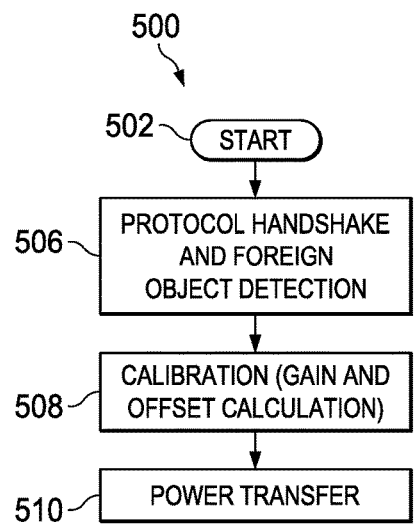
FIG. 5 is a flow diagram for a method.

FIG. 5 is a flow diagram for a method for initiating charging. Method 500 is a process for operating a transmitter such as transmitter 300 (FIG. 3) to control the startup and the power transmission to a receiver, such as receiver 400 (FIG. 4). Method 500 begins at step 502 when a receiver is placed in proximity to the transmitter. Step 506 performs a protocol handshake (e.g. the protocols described in the Qi Specification referenced hereinabove) and foreign object detection (FOD). In the foreign object test, the Q-factor of the coil (such as coil 316 of FIG. 3) can be measured. Any conductive object placed proximate to the coil will cause a change in the Q-factor of the coil 316. If the object is a receiver, such as receiver 400 (FIG. 4), the receiver transmits an expected Q-factor for the coil with the receiver in place. If the measured Q-factor is not approximately equal to the transmitted Q-factor, it can be assumed that a foreign object is present and the charging process can be aborted. Also, in some systems, if there is no expected Q-factor transmitted, it can be assumed that the object is a foreign object (for example, in a case of a foreign object and no receiver is present) and the process can be aborted.

The method then proceeds to step 508 for calibration. In this step, a "no_load" power signal ($P_{transmitted\_no\_load}$) is provided by the transmitter to the receiver, among other calibration steps. The receiver then returns a no load power received signal ($P_{received\_no\_load}$). This information is used to calibrate a foreign object detection process as described hereinbelow.

In step 508, the receiver also returns a connected power received signal ($P_{received\_connected}$). As further explained hereinbelow, the connected power transmit signal ($P_{transmitted\_connected}$) and connected power received signal ($P_{received\_connected}$) are used to calculate a calibration gain and offset. When calibration is complete, if the power accounting process does not detect a foreign object, as described hereinbelow, full power transfer begins at step 510, "Power Transfer".

As noted hereinabove, it is important to detect foreign objects that can be located between the transmit and receive coils to avoid a safety hazard. As noted in Equation [1] hereinabove, unexpected power losses during power transmission, like power dissipated by a foreign object, can be found by comparing the received power to the transmitted power and the expected losses. Simply using the transmitted power and received power at any point has an accuracy of about ±10%, because of the power measurement accuracy of the transmitter and receiver. This accuracy is acceptable if the power capability of the transmitter is less than about 5 W. However, the power levels of wireless charging systems are increasing. For example, under the "Medium Power" extensions of the Qi standard promulgated by the WPC, transmitters capable of transmitting up to 15 W are supported. In absolute terms the error (in Watts) increases proportionally with the power. That is, in a 5 W system, 10% accuracy translates to 500 mW error. In a 15 W system, the same 10% results in 1500 mW error. 1500 mW applied to a foreign object would be a significant hazard because at that power level, dangerous heating of the foreign object can occur.

To increase the accuracy of the measurement of expected losses, a gain and an offset for calibrating the expected received power are determined by extrapolation from the power figures determined in the calibration (508) step. To determine the expected calibrated power measurement, the factors ($P_{transmitted\_no\_load}$), ($P_{received\_no\_load}$), ($P_{transmitted\_connected}$) and ($P_{received\_connected}$) are used. The calibrated power is given by using Equation 2:

$$P_{calibrated} = a \cdot P_{transmitted} + b \qquad [2]$$

Where: $P_{transmitted}$ is the power transmitted during periodic power measurements, a is linear gain determined by Equation 3:

$$a = \frac{P_{received\_connected} - P_{received\_no\_load}}{P_{transmitted\_connected} - P_{transmitted\_no\_load}} \qquad [3]$$

and b is an offset determined by Equation 4:

$$b = P_{received\_no\_load} - (a \cdot P_{transmitted\_no\_load}) \qquad [4]$$

The power loss is corrected using the calibration applied to form a corrected power received. The corrected power received term can be used to accurately determine the unexpected power loss, using Equation 1 with the corrected term.

The power loss is then determined by as difference in Equation 5:

$$P_{input} = P_{received,corrected} + P_{known\ losses} + P_{unexpected\ losses} \qquad [5]$$

where: $P_{received,\ corrected}$ is the power received during the periodic power accounting check and then corrected by the calibration steps.

If $P_{unexpected\ losses}$ is greater than a selected loss threshold at any measurement time, it can be determined that it is likely a foreign object is present, and power transmission can be stopped. The threshold can be determined experimentally by determining the heating that occurs when a power is applied to experimental foreign objects like coins and washers. Alternatively, simulation tools can be used to establish a threshold. In alternative approaches, the transmission power can be reduced to transmit power at a level where heating is not a problem. In still another approach, transmit power is reduced, and the losses are recalculated. If the unexpected loss is still too great, the power transmission stops.

A problem with the calibration scheme of method 500 is that the transmitter doesn't have control over when the receiver will start to draw power. Thus, the "connected" power value obtained by the transmitter may be small (in a case where the receiver is not drawing power) and the connected power value can end up being very close in value to the "no_load" value. Therefore, a transmitter using method 500 may extrapolate from two very close points, which is extremely error prone. When the transmit power is later increased, the calibrated value may not be close to the correct calibrated value.

For example, consider a 15 W system in which the calibration is intended to reduce a 10% error that consists of 8% gain difference between $P_{transmitted}$ and $P_{received}$ and up to 2% noise. In a first (ideal) scenario, assume there is no noise. The transmitted power $P_{transmitted}$ is greater than the received power $P_{received}$ by 8%. Under this ideal scenario, the gain term a is 0.92 and the offset b is 0. The calibration of $P_{received}$ will be perfect regardless of how far apart the two calibration points are.

In a second scenario, the no-load and connected-load values span most of the power range, where no-load is at 0.3 W and connected-load is at 13 W. The gain term is still 0.92 in this scenario. However, in the second scenario, there is an additional ±2% noise error. To be conservative, the noise is assumed to be −2% in the "no load" measurement in calibration step (508) and the noise is assumed to be +2% in the "connected load" measurement in calibration step (508). Thus, the calibration step (508) measures $$0.300 \text{ W} - (8-2)\% = 0.300 \text{ W} - 6\% =$$
$$0.300 \text{ W} - (0.300 \cdot 0.06) = 0.300 \text{ W} - 00.018 \text{ W} = 0.282 \text{ W}$$

In the "connected load measurement, the noise is assumed to be +2%. Thus the renegotiation step measures $$13 \text{ W} - (8+2)\% =$$
$$13 \text{ W} - 10\% = 13 \text{ W} - (13 \cdot 0.10) = 13 \text{ W} - 1.3 \text{ W} = 11.7 \text{ W}$$

The transmitter calculates the gain and the offset (step 508):

$$a = \frac{P_{received\_connected} - P_{received\_no\_load}}{P_{transmitted\_connected} - P_{transmitted\_no\_load}}$$
$$= (11.7 - 0.282)/(13 - 0.3)$$
$$= 0.8991$$

$$b = P_{received\_no\_load} - (a \cdot P_{transmitted\_no\_load})$$
$$= 0.282 - (0.8991 \cdot 0.3)$$
$$= 0.0123$$

When a measurement is taken at mid-range value, for example 8 W, with a −8% error, the $P_{received}$ is 7.36. Using the above process to calculate the power loss:

$$P_{calibrated} = a \cdot P_{transmitted} + b$$
$$= 0.8991 \cdot 8.0 + 0.0123$$
$$= 7.2051 \text{ W}$$

$$P_{loss} = P_{received} - P_{calibrated}$$
$$= 7.36 - 7.2051$$
$$= 0.1549 \text{ W} = 154.9 \text{ mW}$$

This is an acceptable error.

However, in a third scenario where the no-load and connected-load points are close, the error is larger. Assume that no-load is at 0.3 W and connected-load is at 0.8 W. Using the same 8%±2% factors of the second scenario hereinabove, the same −6% and −10% errors are applied as used above in the second scenario. Therefore, the $P_{received}$ during calibration is 0.282 W ($P_{received\_no\_load}$) and during renegotiation is 0.72 W ($P_{received\_connected}$). Gain and offset are calculated as:

$$a = \frac{P_{received\_connected} - P_{received\_no\_load}}{P_{transmitted\_connected} - P_{transmitted\_no\_load}}$$
$$= (0.72 - 0.282)/(0.8 - 0.3)$$
$$= 0.876$$

$$b = P_{received\_no\_load} - (a \cdot P_{transmitted\_no\_load})$$
$$= 0.282 - 0.876 \cdot 0.3$$
$$= 0.0192$$

Using this calibration data with the same mid-range value of 8 W ($P_{transmitted}$) with the same −8% error then $P_{received}$=7.36 W:

$$P_{calibrated} = a \cdot P_{transmitted} + b$$
$$= 0.876 \cdot 8.0 + 0.0192$$
$$= 7.0272 \text{ W}$$

$$P_{loss} = P_{received} - P_{calibrated}$$
$$= 7.36 - 7.0272$$
$$= 0.3382 \text{ W}$$
$$= 332.8 \text{ mW}$$

Thus, with poorly conditioned inputs (i.e. no-load and connected load powers close to each other) the calculated loss error is over double that of that of the well-conditioned input example hereinabove (0.3 W and 13 W) at 332.8 mW.

More generally, if the calibration samples encompass the entire range, the worst case error in the calculation of power loss will be at most the noise in the measurement (in the preceding example 2%). If the points are close together the 2% error can be amplified by the ratio of the calibration range to the full range. However, the operating range is not in the transmitter's control, and the calibration procedure specified by the WPC requires the receiver to send both light-load and connected-load packets immediately after performing the pre-power transfer test to ensure no foreign objects are present. If the receiver reports a no-load and a connected-load power value that are close together, the transmitter will use those points in the method of FIG. 5. As described hereinabove, error can occur.

Figure 6:
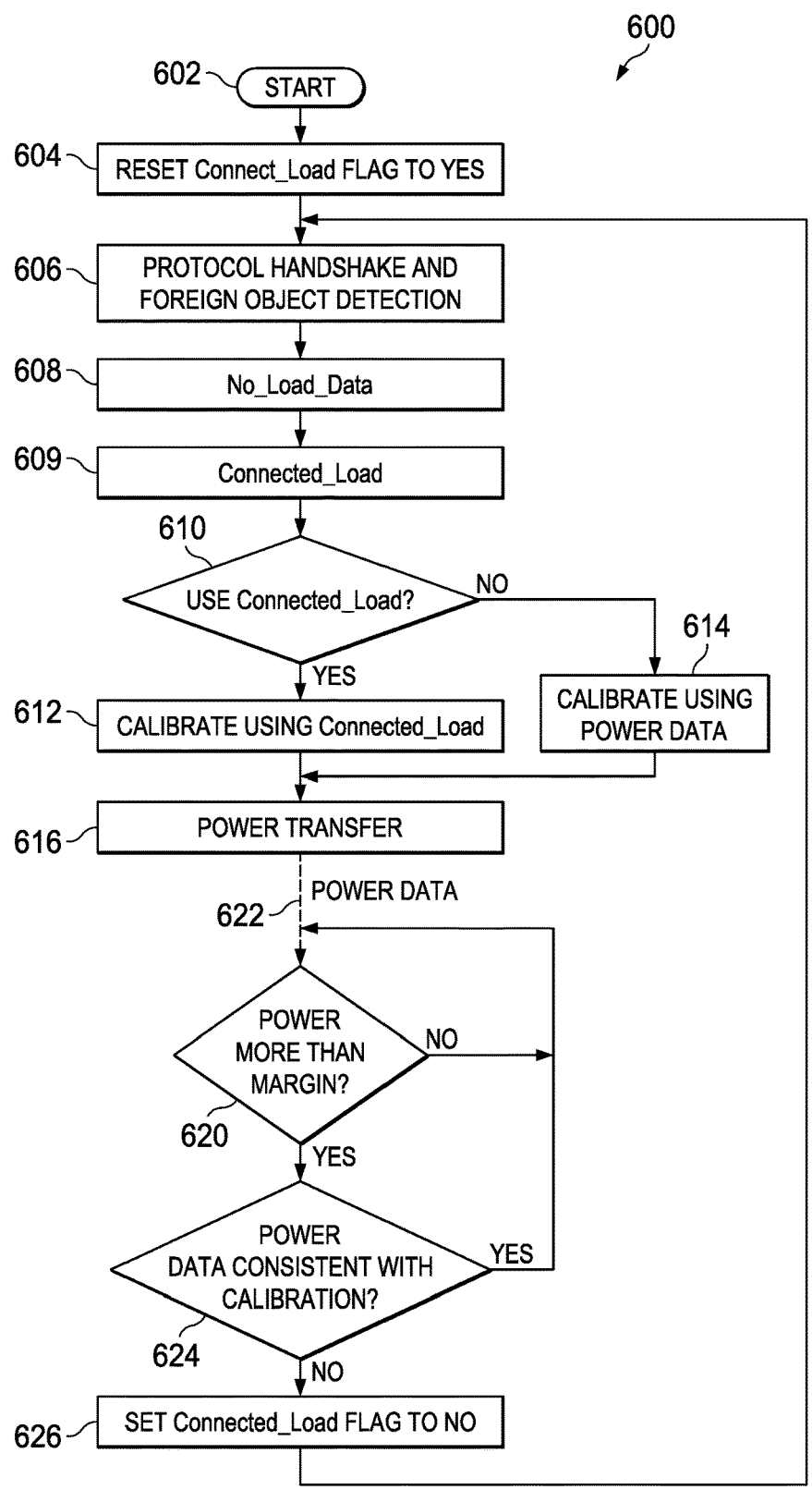
FIG. 6 is an additional flow diagram of another method.

FIG. 6 is a flow diagram of a method aspect of the present application. Method 600 begins with step 602 when a device is placed in proximity to the transmitter (such as transmitter 300 of FIG. 3). Step 604 sets a Connected_Load flag to yes. This indicates that the connected load data has not been superseded by subsequent power data as described hereinbelow. As with method 500, step 606 performs a protocol handshake and FOD, such as the Q factor process described hereinabove. Step 608 determines the No_Load data. At step 609, connected load data is collected. Step 610 determines the value of the Connected_Load flag. If it is yes, step 612 determines calibration (gain and offset) using connected load data from the measurement step of 609. Power transfer begins in step 616. The transmitter (300 of FIG. 3) receives power data 622 at periodic intervals from the receiver (400 in FIG. 4). Step 620 determines if the receiver is receiving more than a threshold (e.g. 10%) greater than connected load power from step 612. If not, step 620 continues to monitor the power data provided by the receiver.

If the power data is greater than the threshold, step 624 compares the power data compared to the expected power data as determined using the current calibration and Equation [2] hereinabove. If the power data matches the expected power using the current calibration (within a selected margin of error), step 620 continues to monitor the power data. If the power data is not consistent with the calibration, step 626 sets the Connected_Load flag to "no" and the method loops back to step 606. Step 606 includes the FOD process so that, if a foreign object has intervened after calibration, it can be detected. Method 600 continues as described above. However, because the Connected_Load flag is set to no, step 614 uses the new power data rather than the connected load data for calibration. This allows for a calibration with a greater difference between the no_load data and the higher load data, and thus ameliorates the problems discussed hereinabove. As made clear by the examples described hereinabove, the calibration is improved significantly when a larger portion of the operating range is included in the computation of the correction terms. However, it is important to do the calibration while knowing that there isn't a foreign object present. If the recalibration calculation based on the updated new power data was performed when a foreign object was present, from then on, using the recalibrated gain and offset, the loss caused by the foreign object would appear "normal" and the object would become undetectable. To avoid this problem, it is desirable to perform the FOD check as close to calibration as possible.

In an example arrangement that forms an aspect of the present application, communications and control unit 334, inverter 332 and current sense 336 (FIG. 3) can be a single integrated circuit. In an alternative example, the command and control unit 334 (FIG. 3) can be in one integrated circuit, while the remaining components of FIG. 3 are on another separate integrated circuit. In a further alternative, discrete components can form some or all of the components of power transmitter 300. The inverter 332 can include a wide variety of commercially available devices for power switching including back-to-back power FETs, single power FETs, SOI FETs, bipolar junction transistors (BJTs) and mechanical relay switches. Multi-chip modules can form packages for the command and control unit and the remaining circuitry in a single packaged device, even when separate integrated circuits implement the inverter and the remaining components. In another alternative example, a module or circuit board can form the embodiments and can use discrete components to implement the components. In further alternatives, the embodiments can use off the shelf integrated circuits, such as logic circuits, operational amplifiers and power devices. Stacked die arrangements can be used with the circuitry to form modules.

In an example arrangement, an integrated circuit includes a communication and control unit. The communication and control unit includes a control unit for controlling an inverter, the inverter converting an input voltage to an alternating current output signal for application to a transmission coil for reception by a receiver. The communication and control unit also includes a communication unit for modulating transmissions to the receiver and demodulating transmissions from the receiver. The control unit causes the inverter to provide a first transmit power to the transmission coil. The communication unit receives a first power received signal from the receiver in response to the first transmit power, the control unit causing the inverter to provide a second transmit power to the transmission coil and the communication unit receives a second power received signal from the receiver in response to the second transmit power. The communication and control unit uses the first transmit power, the first power received signal, the second transmit power and the second power received signal to determine a first gain and a first offset. When a third transmit power greater than the second transmit power is transmitted by the transmission coil and a third power received signal is received by the communication unit from the receiver in response to the third transmit power, the communication and control unit determines a second gain and a second offset using the first transmit power, the first power received signal, the third transmit power and the third power received signal.

In another arrangement, a foreign object detection is performed before determining the second gain and the second offset.

In another arrangement, a fourth transmit power greater than the third transmit power is transmitted by the transmission coil and a fourth power received signal is received by the communication unit from the receiver in response to the fourth transmit power, the communication and control unit determines a third gain and a third offset using the first transmit power, the first power received signal, the fourth transmit power and the fourth power received signal.

In yet another arrangement, a foreign object detection is performed before determining the third gain and the third.

In another arrangement, the communication and control unit determines the second gain and the second offset if the third transmit power is more than a selected threshold greater than the second transmit power.

In another arrangement, the communication and control unit does not determine the second gain and the second offset in response the third transmit power and the third power received signal unless the third transmit power and the third power received signal occur within a selected period of time after the first power received signal.

An example arrangement power transmitter includes a transmission coil. The power transmitter further includes an inverter for converting an input voltage to an alternating current output signal for application to the transmission coil for reception by a receiver. The power transmitter further includes a communication and control unit for modulating transmissions to the receiver, demodulating transmissions from the receiver and controlling the inverter. The communication and control unit causes the inverter to provide a first transmit power to the transmission coil and receive a first power received signal from the receiver in response to the first transmit power. The command and control unit causes the inverter to provide a second transmit power to the transmission coil and receive a second power received signal from the receiver in response to the second transmit power. The communication and control unit uses the first transmit power, the first power received signal, the second transmit power and the second power received signal to determine a first gain and a first offset. When a third transmit power greater than the second transmit power is transmitted by the transmission coil and a third power received signal is received from the receiver in response to the third transmit power, the communication and control unit determines a second gain and a second offset using the first transmit power, the first power received signal, the third transmit power and the third power received signal.

In another arrangement, a foreign object detection is performed before determining the second gain and the second.

In yet another arrangement, when a fourth transmit power greater than the third transmit power is transmitted by the transmission coil and a fourth power received signal is received from the receiver in response to the fourth transmit power, the communication and control unit determines a third gain and a third offset using the first transmit power, the first power received signal, the fourth transmit power and the fourth power received signal.

In yet another arrangement, a foreign object detection is performed before determining the third gain and the third.

In another arrangement, the communication and control unit determines the second gain and the second offset if the third transmit power is over a selected threshold greater than the second transmit power.

In another arrangement, the communication and control unit does not determine the second gain and the second offset in response the third transmit power and the third power received signal unless the third transmit power and the third power received signal occur within a selected period of time after the first power received signal.

An example arrangement method for operating an integrated circuit includes causing an inverter to provide a first transmit power to a transmission coil. A first power received signal is received from a receiver receiving power transmitted from the transmission coil in response to the first transmit power. The inverter is caused to provide a second transmit power to the transmission coil. A second power received signal is received from the receiver in response to the second transmit power. A first gain and a first offset is determined using the first transmit power, the first power received signal, the second transmit power and the second power received signal to determine received from the receiver. The inverter is caused to provide a third transmit power to the transmission coil. A third power received signal is received from the receiver in response to the third transmit power. If the third transmit power is greater than the second transmit power, a second gain and a second offset are determined using the first transmit power, the first power received signal, the third transmit power and the third power received signal.

In another arrangement, a foreign object detection is performed before determining the second gain and the second.

In yet another arrangement, in the method, when a fourth transmit power greater than the third transmit power is transmitted and a fourth power received signal is received from the receiver in response to the fourth transmit power, a third gain and a third offset are determined using the first transmit power, the first power received signal, the fourth transmit power and the fourth power received signal.

In another arrangement, a foreign object detection is performed before determining the third gain and the third offset.

Another arrangement, the method includes determining the second gain and the second offset if the third transmit power is over a threshold greater than the second transmit power.

In another arrangement, the second gain and the second offset are determined if the third transmit power and the third power received signal occur before a selected period of time after the first transmit power signal.

Another arrangement, the method includes performing a foreign object detection procedure before causing the inverter to transmit the second transmit power.

In another arrangement, the transmission of power is stopped if a calibrated received power that is calculated using the second gain and the second offset is a selected loss threshold less than the corresponding power transmitted. In a further arrangement, the transmitted power is reduced if the loss threshold is less than the corresponding power transmitted. In yet a further arrangement, the calibration is performed again with the lower transmit power, and if the selected loss threshold is still met, the transmission power is stopped.

Modifications are possible in the described example arrangements, and other arrangements are possible within the scope of the claims.

What is claimed is:

1. An integrated circuit, comprising:
a communication and control unit including:
a control unit for controlling an inverter, the inverter configured to convert an input voltage to an alternating current output signal for application to a transmission coil for reception by a receiver; and
a communication unit for demodulating transmissions from the receiver;
the control unit configured to cause the inverter to provide a first transmit power to the transmission coil and the communication unit configured to receive a first power received signal from the receiver in response to the first transmit power, the control unit further configured to cause the inverter to provide a second transmit power to the transmission coil and the communication unit configured to receive a second power received signal from the receiver in response to the second transmit power;
the communication and control unit using the first transmit power, the first power received signal, the second transmit power and the second power received signal to determine a first gain and a first offset, in which, when a third transmit power greater than the second transmit power is transmitted by the transmission coil and a third power received signal is received by the communication unit from the receiver in response to the third transmit power, the communication and control unit determines a second gain and a second offset using the first transmit power, the first power received signal, the third transmit power and the third power received signal.

2. The integrated circuit of claim 1 in which a foreign object detection is performed before determining the second gain and the second offset.

3. The integrated circuit of claim 1 in which, when a fourth transmit power greater than the third transmit power is transmitted by the transmission coil and a fourth power received signal is received by the communication unit from the receiver in response to the fourth transmit power, the communication and control unit determines a third gain and a third offset using the first transmit power, the first power received signal, the fourth transmit power and the fourth power received signal.

4. The integrated circuit of claim 3 in which in which a foreign object detection is performed before determining the third gain and the third transmit power.

5. The integrated circuit of claim 1 in which the communication and control unit determines the second gain and the second offset if the third transmit power is more than a selected threshold greater than the second transmit power.

6. The integrated circuit of claim 1 in which the communication and control unit does not determine the second gain and the second offset in response to the third transmit power and the third power received signal unless the third transmit power and the third power received signal exceed a predetermined threshold which is greater than the second transmit power.

7. A power transmitter comprising:
a transmission coil;
an inverter for converting an input voltage to an alternating current output signal for application to the transmission coil for reception by a receiver; and
a communication and control unit for demodulating transmissions from the receiver and controlling the inverter, the communication and control unit causing the inverter to provide a first transmit power to the transmission coil and to receive a first power received signal from the receiver in response to the first transmit power, causing the inverter to provide a second transmit power to the transmission coil and receive a second power received signal from the receiver in response to the second transmit power, the communication and control unit using the first transmit power, the first power received signal, the second transmit power and the second power received signal to determine a first gain and a first offset, in which, when a third transmit power greater than the second transmit power is transmitted by the transmission coil and a third power received signal is received from the receiver in response to the third transmit power, the communication and control unit determines a second gain and a second offset using the first transmit power, the first power received signal, the third transmit power and the third power received signal.

8. The power transmitter of claim 7 in which in which a foreign object detection is performed before determining the second gain and the second offset.

9. The power transmitter of claim 7 in which, when a fourth transmit power greater than the third transmit power is transmitted by the transmission coil and a fourth power received signal is received from the receiver in response to the fourth transmit power, the communication and control unit determines a third gain and a third offset using the first transmit power, the first power received signal, the fourth transmit power and the fourth power received signal.

10. The power transmitter of claim 9 in which in which a foreign object detection is performed before determining the third gain and the third offset.

11. The power transmitter of claim 7 in which the communication and control unit determines the second gain and the second offset if the third transmit power is over a selected threshold greater than the second transmit power.

12. The power transmitter of claim 7 in which the communication and control unit is further configured for modulating transmissions to the receiver.

13. A method for operating an integrated circuit comprising:
  causing an inverter to provide a first transmit power to a transmission coil;
  receiving a first power received signal from a receiver receiving power transmitted from the transmission coil in response to the first transmit power;
  causing the inverter to provide a second transmit power to the transmission coil;
  receiving a second power received signal from the receiver;
  determining a first gain and a first offset using the first transmit power, the first power received signal, the second transmit power and the second power received signal to determine received from the receiver;
  causing the inverter to provide a third transmit power to the transmission coil;
  receiving a third power received signal from the receiver;
  determining, if the third transmit power is greater than the second transmit power, a second gain and a second offset using the first transmit power, the first power received signal, the third transmit power and the third power received signal.

14. The method of claim 13 in which in which a foreign object detection is performed before determining the second gain and the second offset.

15. The method of claim 13 in which, when a fourth transmit power greater than the third transmit power is transmitted and a fourth power received signal is received from the receiver in response to the fourth transmit power, determining a third gain and a third offset using the first transmit power, the first power received signal, the fourth transmit power and the fourth power received signal.

16. The method of claim 15 in which in which a foreign object detection is performed before determining the third gain and the third offset.

17. The method of claim 13 further comprising determining the second gain and the second offset if the third transmit power is over a selected threshold greater than the second transmit power.

18. The method of claim 13 in which the second gain and the second offset are determined if the third transmit power and the third power received signal occur before a selected period of time after the first transmit power.

19. The method of claim 13 further comprising performing a foreign object detection procedure before causing the inverter to transmit the second transmit power.

20. The method of claim 13 in which a transmission of power is stopped if a calibrated received power that is calculated using the second gain and the second offset is less than a selected threshold amount of a corresponding power transmitted.

* * * * *